(12) United States Patent
Yair

(10) Patent No.: US 10,558,639 B2
(45) Date of Patent: Feb. 11, 2020

(54) OBJECTS COMPARISON MANAGER

(71) Applicant: SAP SE, Walldorf (DE)

(72) Inventor: Yoram Yair, Rishon Lezion (IL)

(73) Assignee: SAP SE, Walldorf (DE)

( * ) Notice: Subject to any disclaimer, the term of this patent is extended or adjusted under 35 U.S.C. 154(b) by 536 days.

(21) Appl. No.: 15/379,199

(22) Filed: Dec. 14, 2016

(65) Prior Publication Data

US 2018/0165317 A1 Jun. 14, 2018

(51) Int. Cl.
*G06F 17/30* (2006.01)
*G06F 16/23* (2019.01)
*G06F 16/2458* (2019.01)
*G06F 16/21* (2019.01)

(52) U.S. Cl.
CPC ........ *G06F 16/2329* (2019.01); *G06F 16/219* (2019.01); *G06F 16/2474* (2019.01)

(58) Field of Classification Search
CPC . G06F 16/2329; G06F 16/219; G06F 16/2474
See application file for complete search history.

(56) References Cited

U.S. PATENT DOCUMENTS

| | | | | |
|---|---|---|---|---|
| 5,717,924 A * | 2/1998 | Kawai | .................... | G06F 16/289 |
| 6,070,165 A * | 5/2000 | Whitmore | ............. | G06F 16/284 |
| 7,120,746 B2 | 10/2006 | Campbell et al. | | |
| 7,290,018 B2 | 10/2007 | Muecklich et al. | | |
| 7,359,915 B1 * | 4/2008 | Bush | .................. | G06F 11/3409 |
| 7,788,243 B2 | 8/2010 | Pasupuleti et al. | | |
| 8,041,677 B2 | 10/2011 | Sumner et al. | | |
| 8,260,793 B2 | 9/2012 | Kiraly et al. | | |
| 8,612,405 B1 * | 12/2013 | van Rotterdam | ..... | G06F 16/219 707/695 |
| 2004/0153469 A1 * | 8/2004 | Keith-Hill | ............... | G06F 16/20 |
| 2006/0085465 A1 * | 4/2006 | Nori | ...................... | G06F 16/213 |
| 2008/0154986 A1 | 6/2008 | Kavuri et al. | | |
| 2009/0204636 A1 * | 8/2009 | Li | .......................... | G06F 16/174 |
| 2010/0070481 A1 | 3/2010 | Mantena et al. | | |
| 2011/0145210 A1 * | 6/2011 | Rathinann | ............. | G06F 16/907 707/705 |
| 2011/0295876 A1 * | 12/2011 | Zazrivec | ................ | G06F 16/213 707/769 |
| 2013/0117232 A1 * | 5/2013 | Lee | ........................ | G06F 16/214 707/639 |
| 2015/0088815 A1 * | 3/2015 | Billapati | .................. | G06F 16/21 707/609 |
| 2015/0120671 A1 * | 4/2015 | Kao | ..................... | G06F 11/1451 707/654 |
| 2015/0363434 A1 * | 12/2015 | Cerasaro | ............. | G06F 16/2358 707/616 |

* cited by examiner

*Primary Examiner* — Jared M Bibbee
(74) *Attorney, Agent, or Firm* — Sterne, Kessler, Goldstein & Fox P.L.L.C.

(57) ABSTRACT

Disclosed herein are system, method, and computer program product embodiments for objects comparison manager. An embodiment operates by receiving a request to compare two versions of an object, including a saved version of the object and a modified version of the object. A user-defined schema for the object is determined. The two versions of the object are compared based on the user-defined schema. As a result of the comparison, a variation between the modified version and the saved version of the object is determined. The variation between the two versions of the object is saved.

20 Claims, 3 Drawing Sheets

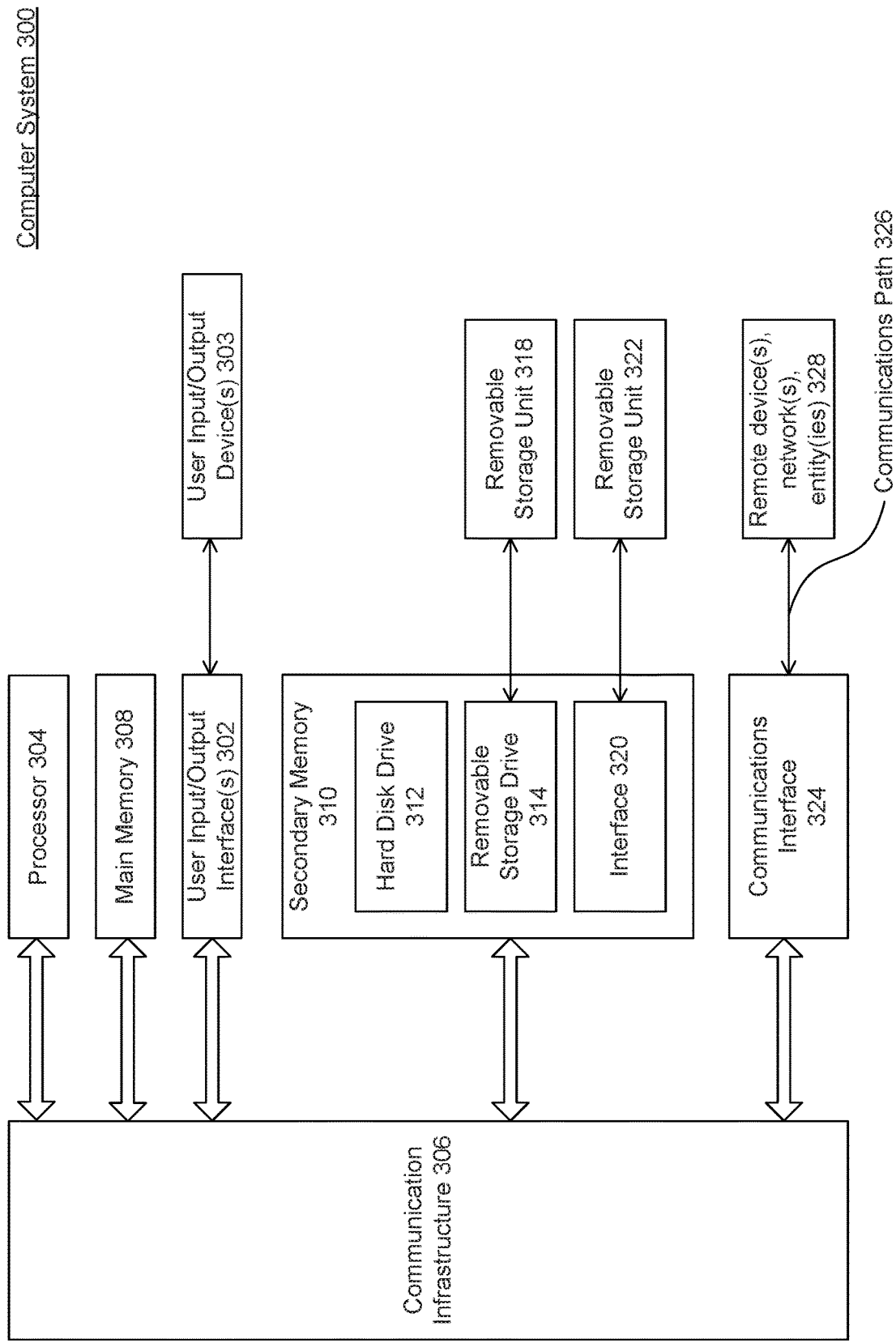

OBJECTS COMPARISON MANAGER

BACKGROUND

Maintaining data integrity is an important part of information systems. When a user makes changes to data stored on a system, the user often modifies a copy of the data. When the user wants to save the changes, a system will often save the entire copy of the data to which the user has access, particularly if the data is part of a user-defined object. However, if the user is accessing a large amount of data, saving the entire copy may consume a large amount of resources.

BRIEF DESCRIPTION OF THE DRAWINGS

The accompanying drawings are incorporated herein and form a part of the specification.

FIG. 3 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for an objects comparison manager.

Figure 1:
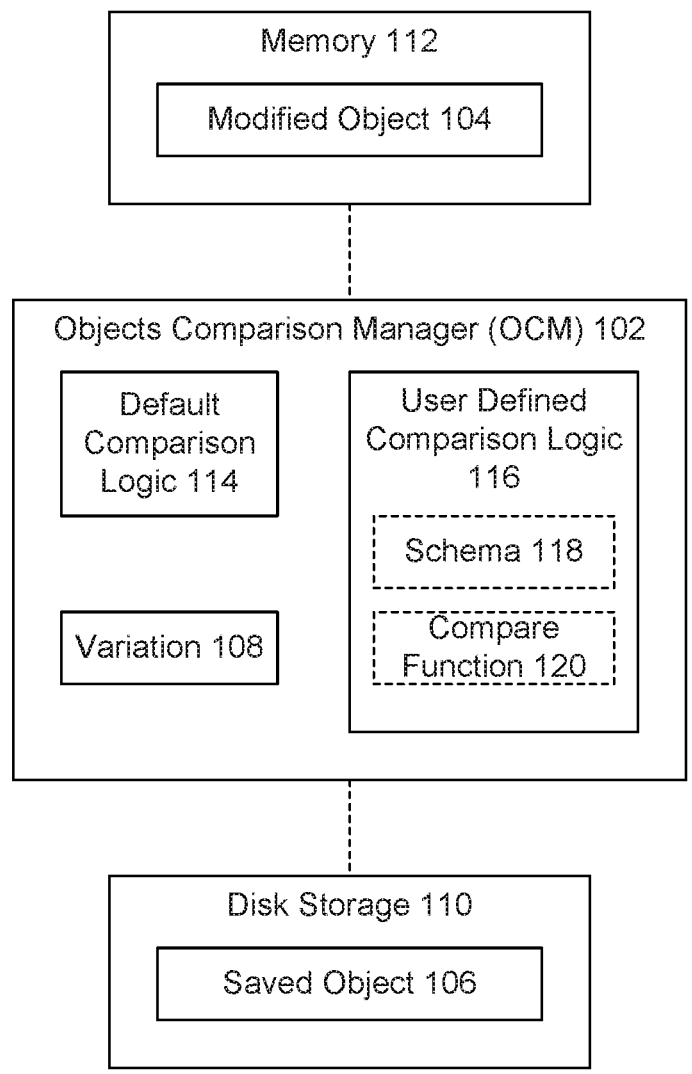
FIG. 1 is a block diagram of an objects comparison manager, according to an embodiment.

FIG. 1 is a block diagram of an objects comparison manager (OCM) 102, according to an example embodiment. OCM 102 compares a modified object 104 to a saved object 106 to determine a variation 108 between the two versions of the object. In an embodiment, the object may be a user-defined object of an object-oriented system. For example, C++ may allow developers or users to define their own objects which may be used in system 100.

In an embodiment, saved object 106 may be stored on a disk storage 110 and may be accessible to users for access or modification. For example, saved object 106 may be stored on a database of a server, and may be accessible to one or more user or client devices over a network. Saved object 106 may be populated with different data. In an embodiment, saved object 106 may be a master copy of an object or the data therewith. A user device may request a copy of the saved object 106 to update the data or make other changes. In response to the request, a copy of saved object 106 may be made or otherwise provided or made accessible to the user device (e.g., for example over a network. A user operating the user device may then modify the copy of saved object 106 which may be stored in memory 112 (e.g., or at the user device) as modified object 104.

As such, a first version of an object may be stored in disk storage 110 as saved object 106, and a second or modified version of the object may be stored in memory 112 as modified object 104. In an embodiment, disk storage 110 may be non-volatile or persistent storage while memory 112 may be volatile storage. Or for example, disk storage 110 may refer to a server that makes instances or copies of saved object 106 available to one or more client devices (e.g., mobile phones, laptop computers, servers, workstations, etc.) for access and/or modification as memory 112.

A user having made or received (e.g., from another device or source) changes to modified object 104 may want to save those changes to disk storage 110. Rather than saving a new copy of the entire modified object 104 to disk storage 110 each time the user wants to save the changes, or each time a save command is received, which may consume a large number of resources, such as processor cycles and memory, particularly as the size of modified object 104 grows, objects comparison manager (OCM) 102 provides for more efficient processor operation, particularly while performing a save command.

Saving the entire copy of modified object 104 is often unnecessary as the user may have only modified one or two small or discrete portions of the object in memory 112. These portions may be small, relative to the overall size of modified object 104, were it to be saved in its entirety, as there may be portions of modified object 104 that were unchanged. As such, saving an entirely new copy of modified object 104 to disk storage 110 would unnecessarily waste processor and computing resources, such as processing cycles or memory. This may in turn cause other processing delays in performing other processing activities. However, if the object is a user-defined object then the processor may have no other way to ensure that all the user's changes were saved.

Objects comparison manager (OCM) 102 enables a system, including one or more processors, to save resources and speed up execution of save commands particularly for user-defined objects. OCM 102 may determine how modified object 104 differs from saved object 106 (e.g., variation 108), and may save only those changes or modifications (variation 108) to disk storage 110 (which may include rewriting one or more portions of saved object 106), rather than saving an entirely new copy of modified object 104. As such, OCM 102 may preserve computing resources and speed up execution of the processor (e.g., including how the processor executes certain commands, such as save commands).

In an embodiment, OCM 102 may process two different types of objects, default objects and user-defined objects. Modified object 104 and saved object 106 may be instances of a user-defined object or data-type. A default object may be a well-known or standard object or data-type used across different computing systems. Example, default objects may include integers, real numbers, chars, date, Boolean, etc. If a user modifies a default object, then OCM 102 knows how to compare and determine changes to a default object. For example, OCM 02 may use default comparison logic 114 to process or determine changes to default objects or data types. Default comparison logic 114 may enable OCM 102 to compare two ints, two real numbers, or two Boolean values (e.g., one from modified object 104 and one from saved object 106) to determine what, if anything, has changed and how to save the changes to disk storage 110.

However, if a user has changed or modified a user-defined object or the value of a user-defined data type, then OCM 102 may use a user-defined comparison logic 116 to determine what modifications (if any) were made. There are a large variety of user-defined objects that may exist in a single system or across different systems depending on the structure or purpose of the system. Even two systems that perform similar functions may include different user-defined objects according to an embodiment.

In order to determine the particularities of user-defined objects in a given embodiment, user-defined comparison logic 116 may include a schema 118 and a compare function 120 corresponding to the user-defined object(s). User-defined comparison logic 116 may enable OCM 102 to determine how to evaluate or compare modified object 104 and saved object 106 to determine what variation 108 (if any) exists between them. OCM 102 may then save variation 108 to disk storage 108, rather than saving an entirely new copy of modified object 104 to replace or store in conjunction with saved object 106. In an embodiment, OCM 102 may save variation 108 separately from saved object 106 on disk storage. In another embodiment, OCM 102 may overwrite or modify portions of saved object 106 according to variation 108.

Schema 118 may be a description of the structure of a user-defined object. In an embodiment, schema 118 may include different properties of a user-defined object, including for example variables, data types, and methods for accessing and modifying data and state information about the user-defined object. In an embodiment, schema 118 may be a class definition (e.g., object-oriented class definition) or one or more user-defined objects.

The object schema descriptor (i.e., schema 118) may be a description of the structure of a user-defined object. In an embodiment, schema 118 may include different properties of a user-defined object, including for example variables, data types, and methods for accessing and modifying data and state information about the user-defined object. In an embodiment, schema 118 may be a class definition (e.g., object-oriented class definition) or one or more user-defined objects.

In an embodiment, schema 118 may include a description of lines. In the example shown in table 1 below, each line may include items from a structure called CompareObjectItems. Based on this struct, compare function or manager 120 may determine what is the content or data of the objects for or during a comparison operation in a very detailed and customized way.

TABLE 1

| struct CompareObjectItems |
| --- |
| { |
| OBJECT_TYPE objType; |
| char name[50]; |
| OBJ_OPER getValue; |
| OBJ_OPER setValue; |
| OBJ_OPER getSize; |
| OBJ_OPER compareFunc; |
| OBJ_OPER processFunc; |
| }; |

OBJECT_TYPE may be an enumeration that includes all the known lines types in the object schema descriptor. In an embodiment, OBJECT_TYPE may include standard data properties such as date, Boolean, number, etc. and as well as the ability to state the start of an object, end of an object, or sub-object. An example list of data properties for OBJECT_TYPE is provided in Table 2.

TABLE 2

| enum OBJECT_TYPE |
| --- |
| { |
| ObjectStart=0, |
| OjectEnd, |
| PropNumber, |
| PropString, |
| PropDate, |
| PropFloat, |
| PropChar, |
| PropDouble, |

TABLE 2-continued

| PropBool, |
| --- |
| PropBinary, |
| PropMLString, |
| PropStringArray, |
| UserType1, |
| UserType2, |
| UserType3, |
| UserType4, |
| UserType5, |
| UserType6, |
| UserType7, |
| UserType8, |
| UserType9, |
| UserType10 |
| }; |
| **The developer may modify this enumeration to accommodate it to meeting object requirements |

In an embodiment, an OBJ_OPER may be an enumeration that includes possible operations types available to the compare function 120. For example, a developer may provide via OBJ_OPER the different available operations. OBJ_OPER may include compare functions provided or called by a user to handle user-defined data types as well as functions that may be executed by comparison function 120 upon execution upon a determination that a change is found during the match operation. An example OBJ_OPER enumeration is provided in Table 3.

TABLE 3

| enum OBJ_OPER |
| --- |
| { |
| None=0, |
| ValueGet, |
| ValueSet, |
| CompareValue, |
| GetNumOfItems, |
| UserCompare1, |
| UserCompare2, |
| UserCompare3, |
| UserCompare4, |
| ProcessExt1, |
| ProcessExt2, |
| ProcessExt3, |
| ProcessExt4 |
| }; |
| **The developer may modify this enumeration to accommodate it to meeting object requirements |

Below is illustrated a partial example of a schema 118, according to an embodiment. In the example below, two example schemas 118 are illustrated, one for a Jobs object and a Steps object (which may be a sub-object of the jobs object). A sub-object may be a user-defined object that is defined in context of another user-defined object. In the example shown, Jobs may include different variables including Id, Name, Launcher, isCheckOut, Records, and Data. The variables may be associated with different methods including a get value method (to retrieve or access a data value), a set value method (used to modify or set a new data value), and a compare value method (used to compare two different objects/variables/instances with values). The compare value method may be provided or implemented in compare function 120.

CompareObjectItems compareObjectsArray[ ] =
{{ObjectStart, "Job", None, None, GetNumOfItems, None ,None},
{PropNumber, "Id", ValueGet, ValueSet, None, CompareValue, None},

```
{PropString, "Name", ValueGet, ValueSet, None, CompareValue,
ProcessExt1},
{PropString, "Launcher", ValueGet, ValueSet, None, CompareValue,
ProcessExt1},
{PropBool, "isCheckOut", ValueGet, ValueSet, None, CompareValue,
ProcessExt1},
{PropNumArray, "Records", ValueGet, ValueSet, None, CompareValue,
ProcessExt1},
{UserType1, "Data", ValueGet, ValueSet, None, UserCompare1,
ProcessExt1},
/* Object Steps within each Job object */
{ObjectStart, "Steps", None, None, GetNumOfItems, None, None},
{PropNumber, "Id", ValueGet, ValueSet, None, CompareValue, None},
{PropString, "Name", ValueGet, ValueSet, None, CompareValue,
ProcessExt2},
{PropNumber, "Type", ValueGet, ValueSet, None, CompareValue ,
ProcessExt2},
{PropBool, "isCheckOut", ValueGet, ValueSet, None, CompareValue,
ProcessExt2},
{PropNumArray, "Records", ValueGet, ValueSet, None, CompareValue,
ProcessExt2},
{PropBinary, "Data", ValueGet, ValueGet, None, UserCompare1,
None},
{ObjectEnd, "Steps", None, None, None, None, None},
/* End of Steps object */
```

Each schema 118, or one or more schemas 118, may be associated with a compare function 120 of user defined comparison logic 116. OCM 102 may call or execute compare function 118 when performing a save or other command that requires a comparison between modified object 104 and saved object 106.

Below is illustrated an example portion of a compare function 120, according to an embodiment. The compare function 120 shown in the example below illustrates an example of a virtual class or shell which may be implemented by a developer or other user and provided to OCM 102 (in conjunction with schema 118). The example shown illustrates only one embodiment of how compare function 120 may be organized, other embodiments may include different structures or virtual functions. As shown, compare function 120 includes a get value and set value method (as referenced above from schema 118). The class 120 may also include a get size method which may be used to retrieve or determine how many objects or values are to be compared.

```
class CompareObject
{
public:
    // two base methods for getting and setting based level
values (Value struct)
    // from user objects.
    virtual void     SetBaseValue    (CompareObject* cmpObject,
string indexStr, Value value)=0;
    virtual Value    GetBaseValue    (CompareObject* cmpObject,
string indexStr)=0;
    // let the compare object knows how many lines (meaning sub-
objects) in a compared
    // object at certain location in the compare object.
    virtual int      GetSize  (CompareObject* cmpObject, string
indexStr)=0;
```

In an embodiment, compare function 120 may also include special methods for special compare functions. A special compare function may allow a user to indicate that only a particular portion of an object is to be compared during a save command, rather than comparing all the data of modified object 104 to all the data of saved object 106. For example, a particular object may have a certain amount of data that is static or otherwise unmodifiable by a particular user. As such, comparing this data may waste valuable resources of a processor. As such, special comparison functions may indicate which data to compare between modified object 104 and saved object 106 that may be modifiable by a user trying to save changes.

Using the functions of compare function 120, OCM 102 may determine variation 108 and save variation to disk storage 110. The saving may include cloning one or more portions of modified object 104 and/or overwriting one or more portions of saved object 106, or otherwise writing new data or removing data from saved object 106.

In an embodiment, rather than having or requiring a separate or individually programmed compare function 120 for different user defined objects, system 100 may simplify the process. For example, OCM 102 and compare function 120 may operate independent of an object's individual structure and thus may be reused across different user defined objects with different structures. Instead, for example, OCM 102 and compare function 102 may rely on schema 118 to determine how to compare different user-defined objects. Operating in such a manner requires less programming code, less storage for said code, faster compilation of said code, quicker testing and debugging, and fewer computation or processor cycles to execute said code.

Figure 2:
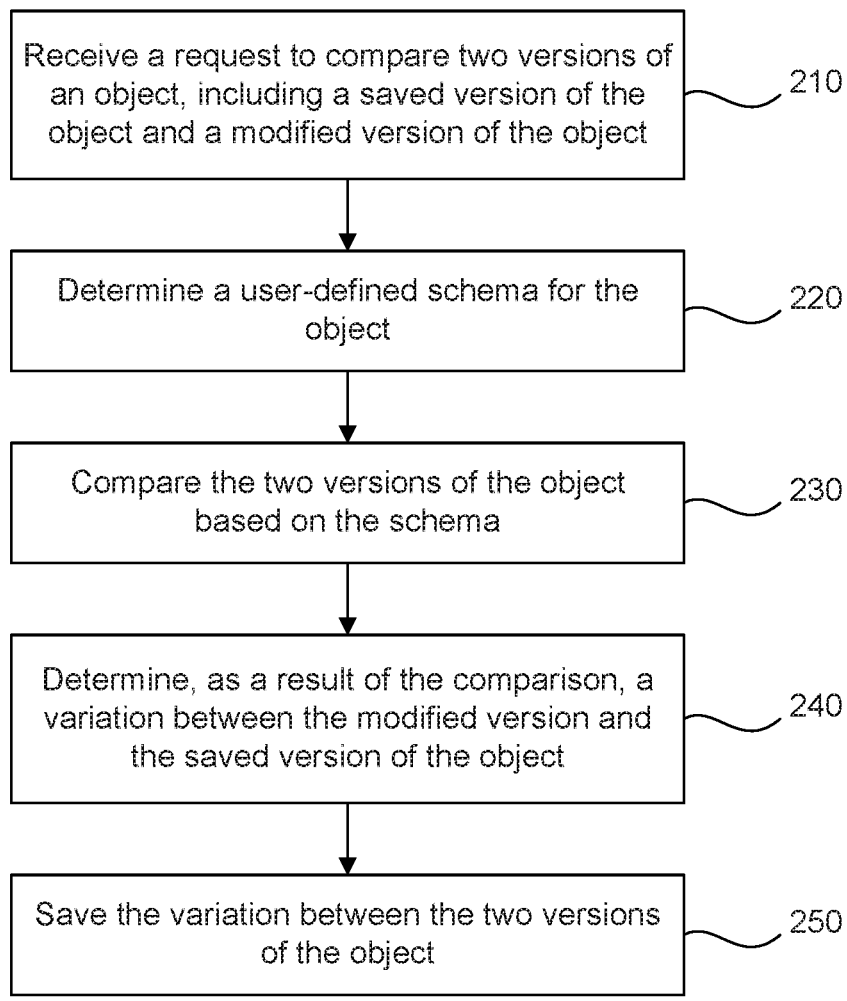
FIG. 2 is a flowchart illustrating a process for an objects comparison manager, according to an embodiment.

FIG. 2 is a flowchart illustrating a process for an objects comparison manager, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, a request to compare two versions of an object is received. For example, OCM 102 may receive a request to save modifications made to modified object 104 to disk storage 110. OCM 102 may compare the modified version 104 to the saved version 106 to determine a variation 108 between the data of the versions of the user-defined object. In an embodiment, the object may include both user-defined data types and default data types which are compared by OCM 102.

At 220, a user-defined schema for the object is determined. For example, OCM 102 may receive or otherwise have access to a schema 118 that describes a structure of a user-defined object. In an embodiment, a developer may provide schema 118 and compare function 120 to OCM 102 for whatever user-defined objects are being used or saved/compared in system 100. OCM 102 may compile or execute a compiled version of user defined comparison logic 116. Then, when a save or compare command is received, OCM 102 may execute the compiled user defined comparison logic 116.

At 230, the two versions of the object are compared based on the schema. For example, OCM 102 may execute compare function 120 on modified object 104 and saved object 106, including one or more portions thereof.

At 240, a variation between the modified version and the saved version of the object is determined. For example, a result of executing the compare function 120 (including a special compare function), OCM 102 may determine a variation 108. Variation 108 may determine which modifications were made to modified object 104 since it was previously synchronized with saved object 106. In an embodiment, if no changes were determined between the two versions of the object, compare function 120 may return a 'false' value indicating no variation 108 exists and nothing needs to be saved or updated.

At 250, the variation between the two versions of the object is saved. For example, OCM 102 may save variation 108 to disk storage 110 by overwriting one or more portions of saved object 106 or saving variation 108 in conjunction with but separately from saved object 106. In an embodiment, variation 108 may be communicated to several devices which may need to be synchronized or otherwise subscribe to updates determined from modified object 104.

In an embodiment, the functions of OCM 102 as described herein may also operate in reverse, and save or synchronize changes from saved object 106 to one or more modified objects 104 (e.g., which may be operating or stored across one or more user devices).

Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, by a processor, a request to compare two versions of an object, including a saved version of the object on a disk and a modified version of the object in a memory;
   determining a user-defined schema comprising an object-oriented class definition corresponding to the object, the user-defined schema comprising instructions associated with performing a comparison of the two versions of the object;
   comparing data between the two versions of the object based on the user-defined schema, wherein data of the modified version of the object varies from data of the saved version of the object;
   determining, as a result of the comparison, a data variation between the data of the modified version and the data of the saved version of the object; and
   saving, to the disk, the data variation between the two versions of the object such that saved version corresponds to the modified version.

2. The method of claim 1, wherein saved version of the object is loaded from disk to the memory, and wherein the request comprises a request to save the modified version of the object to the disk.

3. The method of claim 1, wherein the instructions of the schema indicate on which portion of the object to perform the comparison.

4. The method of claim 3, wherein the instructions indicate one or more portions of the object that are not compared during the comparison.

5. The method of claim 4, wherein the one or more portions that are not compared are not modifiable by a user.

6. The method of claim 1, further comprising:
   receiving the user-defined schema for the object prior to receiving the request; and
   compiling the user-defined schema prior to receiving the request, wherein the determined user-defined schema comprises the compiled user-defined schema.

7. The method of claim 1, wherein the comparing comprises:
   determining a non-user defined portion of the object, wherein the user-defined schema does not comprise instructions associated with comparing the non-user defined portions of the object;
   comparing the non-user defined portion of the object of saved version and the modified version;
   determining a difference in the non-user defined portion of the saved version of the object and the modified version of the object based on the comparing; and
   providing the difference as at least a portion of the variation.

8. The method of claim 1, wherein the disk comprises a database at a server, and the memory comprises a client device that is enabled to remotely access data of the database over a network.

9. A system, comprising:
   a non-transitory memory; and
   at least one processor coupled to the memory and configured to perform operations comprising:
   receiving a request to compare two versions of an object, including a saved version of the object on a disk and a modified version of the object in a memory;
   determining a user-defined schema comprising an object-oriented class definition corresponding to the object, the user-defined schema comprising instructions associated with performing a comparison of the two versions of the object;
   comparing data between the two versions of the object based on the user-defined schema, wherein data of the modified version of the object varies from data of the saved version of the object;
   determining, as a result of the comparison, a data variation between the data of the modified version and the data of the saved version of the object; and
   saving, to the disk, the data variation between the two versions of the object such that saved version corresponds to the modified version.

10. The system of claim 9, wherein saved version of the object is loaded from disk to the memory, and wherein the request comprises a request to save the modified version of the object to the disk.

11. The system of claim 9, wherein the instructions of the schema indicate on which portion of the object to perform the comparison.

12. The system of claim 11, wherein the instructions indicate one or more portions of the object that are not compared during the comparison.

13. The system of claim 12, wherein the one or more portions that are not compared are not modifiable by a user.

14. The system of claim 9, wherein the operations further comprise:
   receiving the user-defined schema for the object prior to receiving the request; and
   compiling the user-defined schema prior to receiving the request, wherein the determined user-defined schema comprises the compiled user-defined schema.

15. The system of claim 9, wherein the operations of the comparing further comprise:
   determining a non-user defined portion of the object, wherein the user-defined schema does not comprise instructions associated with comparing the non-user defined portions of the object;
   comparing the non-user defined portion of the object of saved version and the modified version;
   determining a difference in the non-user defined portion of the saved version of the object and the modified version of the object based on the comparing; and
   providing the difference as at least a portion of the variation.

16. The system of claim 9, wherein the disk comprises a database at a server, and the memory comprises a client device that is enabled to remotely access data of the database over a network.

17. A non-transitory computer-readable device having instructions stored thereon that, when executed by at least one computing device, causes the at least one computing device to perform operations comprising:

receiving a request to compare two versions of an object, including a saved version of the object on a disk and a modified version of the object in a memory;

determining a user-defined schema comprising an object-oriented class definition corresponding to the object, the user-defined schema comprising instructions associated with performing a comparison of the two versions of the object;

comparing data between the two versions of the object based on the user-defined schema, wherein data of the modified version of the object varies from data of the saved version of the object;

determining, as a result of the comparison, a data variation between the data of the modified version and the data of the saved version of the object; and saving, to the disk, the data variation between the two versions of the object such that saved version corresponds to the modified version.

18. The device of claim 17, wherein saved version of the object is loaded from disk to the memory, and wherein the request comprises a request to save the modified version of the object to the disk.

19. The method of claim 1, wherein the determining the variation comprises:

determining that at least a portion of the data of the modified version of the object is identical to the data of the saved version of the object; and wherein the saving comprises copying the data variation from the memory to the disk, wherein the identical portion of the data of the modified object is not copied from the memory to the disk.

20. The method of claim 1, wherein the determining the variation comprises:

invoking a special compare function to determine the data variation, wherein the special compare function comprises a user-identified portion of modified object and the saved object to compare to each other and from which to determine the data variation.

* * * * *